(12) United States Patent
Marquiss

(10) Patent No.: US 7,256,512 B1
(45) Date of Patent: Aug. 14, 2007

(54) VARIABLE APERTURE VELOCITY AUGMENTED DUCTED FAN WIND TURBINE

(75) Inventor: Stanley Marquiss, Plymouth, CA (US)

(73) Assignee: Marquiss Wind Power, Inc., Folsom, CA (US)

( * ) Notice: Subject to any disclaimer, the term of this patent is extended or adjusted under 35 U.S.C. 154(b) by 2 days.

(21) Appl. No.: 11/308,523

(22) Filed: Apr. 1, 2006

(51) Int. Cl.
*F03D 9/00* (2006.01)
*F03D 7/00* (2006.01)
*F03D 7/02* (2006.01)
*H02P 9/04* (2006.01)
*F03B 15/06* (2006.01)

(52) U.S. Cl. ............ 290/55; 290/44; 415/4.1; 415/4.5; 415/908

(58) Field of Classification Search ............ 290/55, 290/54, 43, 44; 416/119, 117, 132 B; 415/4.2, 415/907, 906, 908, 4.3, 7, 2.1, 4.5
See application file for complete search history.

(56) References Cited

U.S. PATENT DOCUMENTS

| | | | | |
|---|---|---|---|---|
| 757,800 A | * | 4/1904 | Williams | 290/55 |
| 4,087,196 A | * | 5/1978 | Kronmiller | 415/4.5 |
| 4,191,505 A | * | 3/1980 | Kaufman | 415/2.1 |
| 4,360,315 A | * | 11/1982 | Olson | 416/41 |
| 4,673,822 A | * | 6/1987 | Kikuchi | 290/44 |
| 5,570,997 A | * | 11/1996 | Pratt | 416/117 |
| 5,616,963 A | * | 4/1997 | Kikuchi | 290/55 |
| 5,808,369 A | * | 9/1998 | Whelan | 290/55 |
| 6,554,573 B1 | * | 4/2003 | Pedersen | 416/117 |
| 6,929,450 B2 | * | 8/2005 | Noble | 416/1 |
| 2003/0122380 A1 | * | 7/2003 | Harbison | 290/55 |
| 2003/0175109 A1 | * | 9/2003 | Brock et al. | 415/4.2 |

* cited by examiner

*Primary Examiner*—Julio Gonzalez

(57) ABSTRACT

A wind powered variable area exit aperture electric generating system having configurable, adjustable duct side walls by which means the ratio between the intake cross-sectional aperture area and the exhaust cross-sectional aperture area may be varied for maximum air molecule flow through the duct, leading to ideal maximum electrical output for any given air mass input. The planar characteristic and angular dispersion of the mutually leading edge coupled extended flaps, and the regular square interior housing result in complementary internal vortices developed at the trailing edge of the planar architectural surfaces.

10 Claims, 15 Drawing Sheets

VARIABLE APERTURE VELOCITY AUGMENTED DUCTED FAN WIND TURBINE

FIELD OF THE INVENTION

This invention relates generally to a variable aperture and geometry ducted fan wind turbine which converges intake air masses allowing use on turbulence inducing, and air input flow increasing adjacent structures, such as commercial and residential buildings. The configurable duct also rapidly directs the turbine intake directly into the wind, while the full aerodynamic housing reduces vibration and noise while completely isolating and shielding the area outside the fan from any fan breakage, while also shielding the fan from objects, birds, and the like, at the intake and exhaust.

BACKGROUND OF THE INVENTION

For several thousand years wind turbines have been used as prime power movers in raising water or powering mills grinding grains. Just after the turn of the 19$^{th}$ Century into the 20$^{th}$ Century, before the First World War, perhaps a million open fan wind turbines were in use within the US alone, pumping water in farms and ranches all over America.

In the late 20$^{th}$ Century, and the beginning 21$^{st}$ Century, rising fuel costs, and increased concern for global pollution and warming have raised wind power generally to the fastest growing renewable energy source on the planet. A recent Stanford University study shows that North America has more sites suitable for locating modern open fan wind turbines than any other continent in the world today. However, modern large open fan wind turbines have certain characteristics and problems in the process of becoming more apparent as the installation base of such turbines increases, In the Altamont, in California, as an example, the open fan wind turbines there kill over one thousand hawks and eagles each year, from collisions between the fan blades and the birds. From an economic point of view, large open fan wind turbine installations are best sited in areas of high wind, which often have a low human population because of the wind; areas in the Dakotas, Kansas, and Texas are a good example. Thus the wind turbine installations must be accompanied by expensive, complete electrical utility infrastructures, and the generated electrical power expensively shipped via high tension lines to the eventual power consumers.

In European countries, such as England, having high quality wind resources, and a large installed large open fan wind turbine base, the location of very visible open fan wind turbines is interfering with aesthetic sight line values concerning tourists. The sightlines to Wordsworth's cottage in Grasmere, in the Lake Country, as an example, are best not obscured and blocked by large open fan wind turbines, from a tourist point of view.

The following patents reflect the state of the art of which the applicant is aware, and are included herewith to discharge applicant's duty to disclose relevant prior art. The stipulation follows, however, that none of the cited patents teach singly, or in combination, nor render obvious when considered in any conceivable combination, the central ideas, or nexus of the present, instant invention, as disclosed in greater detail hereinafter, and as particularly claimed.

| PATENT NUMBER | INVENTOR | ISSUE DATE |
|---|---|---|
| 969,587 | W. A Williams | Sep. 6, 1910 |
| 3,706,430 | Floyd Fogleman Richard Kline | Dec. 19, 1972 |
| 4,046,338 | Floyd Fogleman Richard Kline | Sep. 6, 1977 |
| 4,075,500 | Richard A. Oman Kenneth M. Foreman | Feb. 21, 1978 |
| 4,084,918 | Vladimir H. Pavleca | Apr. 18, 1978 |
| 4,143,992 | Charles W. Crook | Mar. 13, 1979 |
| 4,174,923 | Glen A. Williamson | Nov. 20, 1979 |
| 4,191,505 | John W. Kaufman | Mar. 4, 1980 |
| 4,238,171 | Bernard Van Mechelen | Dec. 9, 1980 |
| 4,279,569 | Gary J. Harloff | Jul. 21, 1981 |
| 5,009,569 | Francis N. Hector Junior and Senior | Apr. 23, 1991 |
| U.S. Pat. No. 6,638,005 B2 | John W. Holter Eric G. Holter | Oct. 28, 2003 |
| U.S. 2004/0156710 A1 patent application Publication | Christopher Norman Gaskel | Aug. 12, 2004 |

Each one of these cited patents can be characterized as providing some form of enclosure for an otherwise open fan, and as providing some form of augmentation to the intake air mass, or as providing the suppression of fan blade vortices, which a shroud normally provides in conjunction with an open fan.

SUMMARY OF THE INVENTION

The instant invention is distinguished over the known prior art in many different ways. One of the most evident, and plainest differences that the instant invention employs over the known prior art is that the adjustable duct side walls, that is the planar characteristic, and angular disposition of the walls of the duct are configurable and adjustable, meaning that the ratio between the cross-sectional intake areas of the input, and the cross sectional area of the output sides of the duct can be precisely matched in aerodynamic efficiency and electrical power output to the input air mass.

Further, because the entire Ducted Fan Wind Turbine, DFWT, aerodynamic structure is supported by a unique double nested pipe structure, integrating a Timken™ type roller track bearing, it is uniquely mobile in a lateral, horizontal sense, and able to track instantaneously changing directional wind conditions, of a type introduced by adjacent turbulence inducing architectural structures.

Some of the windiest real estate in the world is on the tops of commercial and residential buildings and structures. Since wind cannot actually flow through these buildings, it flows over and around them, introducing on the building rooftop additional wind stream flows which represent, according to English studies funded by the Carbon Trust, and by Dutch studies funded by governmental agencies, up to a 2× multiple of typical wind speeds on the ground. Since power in the wind is proportional to the cube of the wind velocity, doubling the input velocity of the wind produces eight times the output power. Thus, if a DFWT produced 1 kilowatt in a 15 MPH wind, it would produce 8 kilowatts in a 30 MPH wind, an extremely significant increase in building useable electrical power.

Buildings themselves are typically large consumers of electrical power. Thus a power source, a Ducted Fan Wind Turbine, sited right upon a building power load, using the augmented wind stream flow created by the building is ideally suited for the most efficient power delivery possible;

no grid interconnect is necessary for power delivery, especially if the building is capable of utilizing all of the power which the DFWT can deliver all of the time.

Thus, a wind turbine sited upon a rooftop must be able to safely intake and utilize highly turbulent wind without any damage or compromised safety to the wind turbine itself. Furthermore, since the wind turbine will be mechanically coupled to the building, it must also NOT generate troublesome, annoying spurious noise and vibration.

The instant invention also benefits from a unique pie wedge stator segmented electrical generator exactly matched from an internal impedance/resistance point of view to the very low internal impedance of the DFWT, for a highly efficient power transfer source to load.

OBJECTS OF THE INVENTION

Accordingly, it is a primary objective of the present invention to provide an aerodynamically configurable, 'can be automatically, intelligently, computer controlled and optimized' new and novel electrical power source to be utilized in conjunction with the windy rooftop locations on commercial and residential buildings and structures based upon enhanced wind stream flows created by those buildings themselves.

A further objective of the present invention is to provide a Ducted Fan Wind Turbine device more comparatively quiet, vibration free and thus safer and more efficient than any presently available ducted fan wind turbines, or open fan wind turbines designed for use in conjunction with or without enhanced stream flows over buildings.

Viewed from a first vantage point, it is an objective of the present invention to provide an aerodynamically configurable and automatically steering wind turbine device as characterized above which can be strategically placed on the rooftops of commercial and residential buildings in such a way that the building structure itself directs additional air mass and velocity flow into the intake aperture of the DFWT for the purpose of increasing the electrical output power of the wind turbine.

Viewed from a second vantage point, it is an objective of the present invention to provide a DFWT device for roof top building mounting which can be completely shielded from the exterior of the housing itself in the event of a fan failure, and which can be completely shielded from the intake and exhaust for the purpose of preventing bird or other object intake into the interior fan housing, and the fan itself of the DFWT. Further, the DFWT is completely balanced and the housing so designed as to prevent noise generation and vibration from being coupled into the architecturally attached building.

Viewed from a third vantage point, it is an objective of the present invention to provide a wind turbine device which may be coupled directly into the mounted building electrical structure for the purpose of maximally efficient electrical power transfer into the building load.

These, and other objects will be made manifest when considering the following detailed drawing specifications when taken in conjunction with the attached and appended drawing figures.

Figure 1:
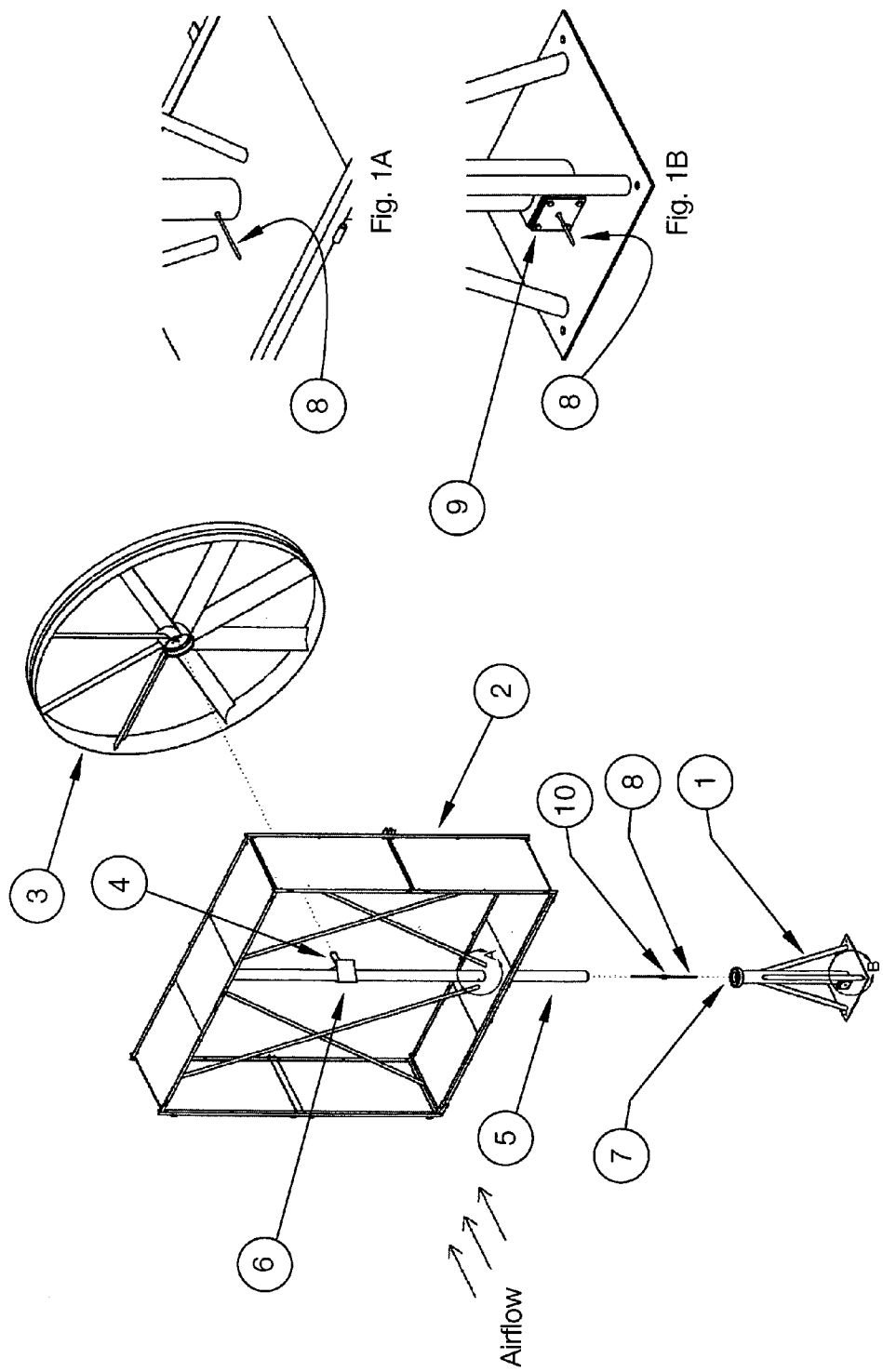
FIG. 1 is a perspective view of the ducted fan center power cell, which is a square having four solid planar, airfoil sides consisting of a metal frame covered either in plywood, fiber composites, or metal, open to the front and the back, which fore and aft openings can be covered on each open side with an open cell metal mesh, preventing the ingress or egress of objects into or out of the cell housing the fan; said FIG. 1 showing the direction of air flow from the left to right, with the fan to be mounted on the fan bearing shaft as shown behind the central cell pipe mast, which at the base below the bottom planar fan cell side fits within a second pipe tube, having four, fewer or more, welded support members, and at the top of the base mount pipe a Timken™ type roller bearing support and base structure. The figure also shows the stream flow diving V structure mounted to the double mast center pole support, which diverts the incoming stream flow around the intake air mass blocking center wheel to which the fan blades are attached, also showing the circumferential annulus which terminates and stiffens the fan turbine blades. The fan itself can be a multiple blade, high solidity turbine type fan system having typical fan airfoil shapes, which fan system could utilize many NACA, NASA type airfoil shapes and configurations, which fan system could further have fewer than six, six, or more than six individual blades, which blade attack angles, and general blade airfoil shapes could further be made actively configurable.

The inset to FIG. 1, FIG. 1A, shows the position of an electrical cable, at the inside bottom of the fan power cell, which brings the output of the turbine type fan electrical generator out into a safety conduit electrical box shown in the related FIG. 1B.

FIG. 1B shows the electrical box to which the stationary power transmission wires are attached. Not shown within the two concentric pipes just above the electrical output box is the MERCOTAC™ type sealed rotating mercury wetted rotating relay, so that cell fan generator assembly lead output wires can rotate through a full 360 degrees without twisting relative to the stationary output wires on the other side of the rotating relay. In this manner the DFWT power cell and attached aerodynamic planar flap structures can rotate through a full 360 degree circle without twisting the power out put wires from the fan power shaft attached electrical power generator, to the stationary mounted inverter.

The output wires from the power fan cell generator, leading through both the inner fan power cell support mast pipe, and the outer bass support pipe which carries the tapered roller bearing assembly are also shown in FIG. 1, between the bottom of the fan power cell and the top of the fan base. Said wires are attached to one another through a MERCOTAC™ type mercury wetted sealed high power rotating relay.

Figures 2, 2A:
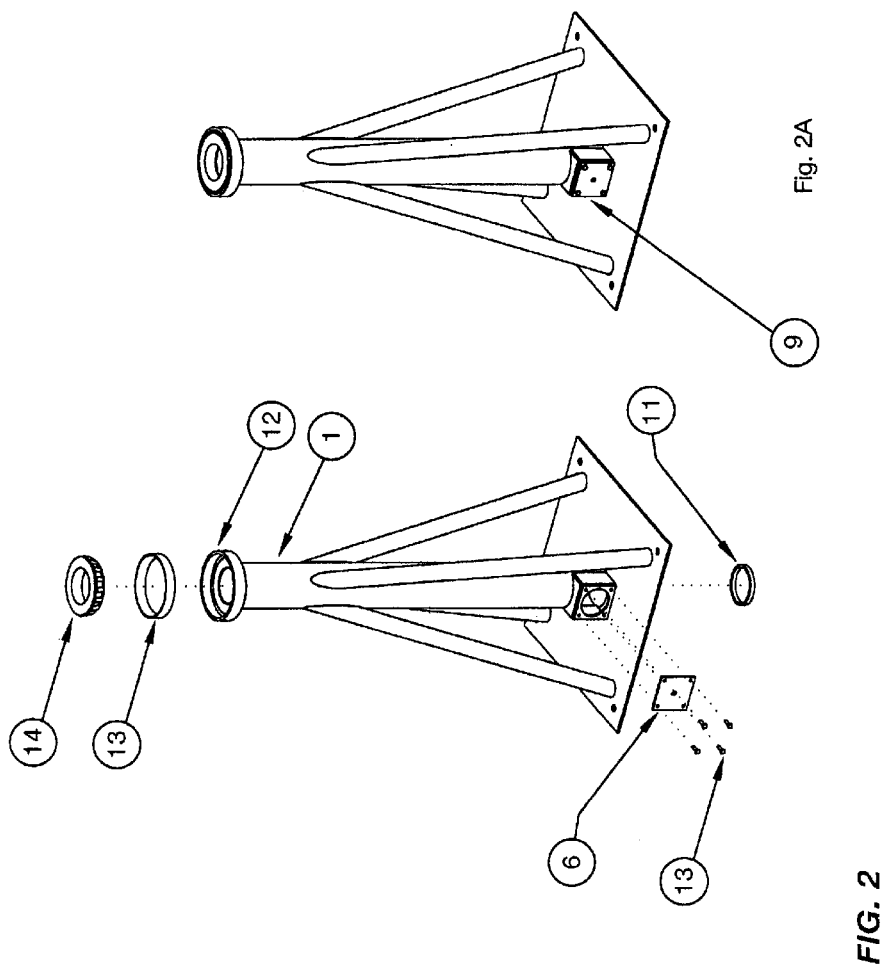

FIG. 2 shows further detail on the TIMKEN™ type roller bearing mount allowing the power cell inner pipe to rotate freely and silently within the base pipe outer mount pipe. FIG. 2 also shows the UHMW ultra high molecular weight plastic insert which fits over the inner fan power cell pipe, and forms a bearing to the outer base pipe.

FIG. 2A shows the tapered roller bearing race, and bearing assembly placed within the open aperture of the centrally located pipe mast support base, with the TIMKEN™ type tapered roller bearing retained in place by the steel collar welded to the centrally located pipe mast support base, through which passes the center fan power cell mast.

Figure 3:
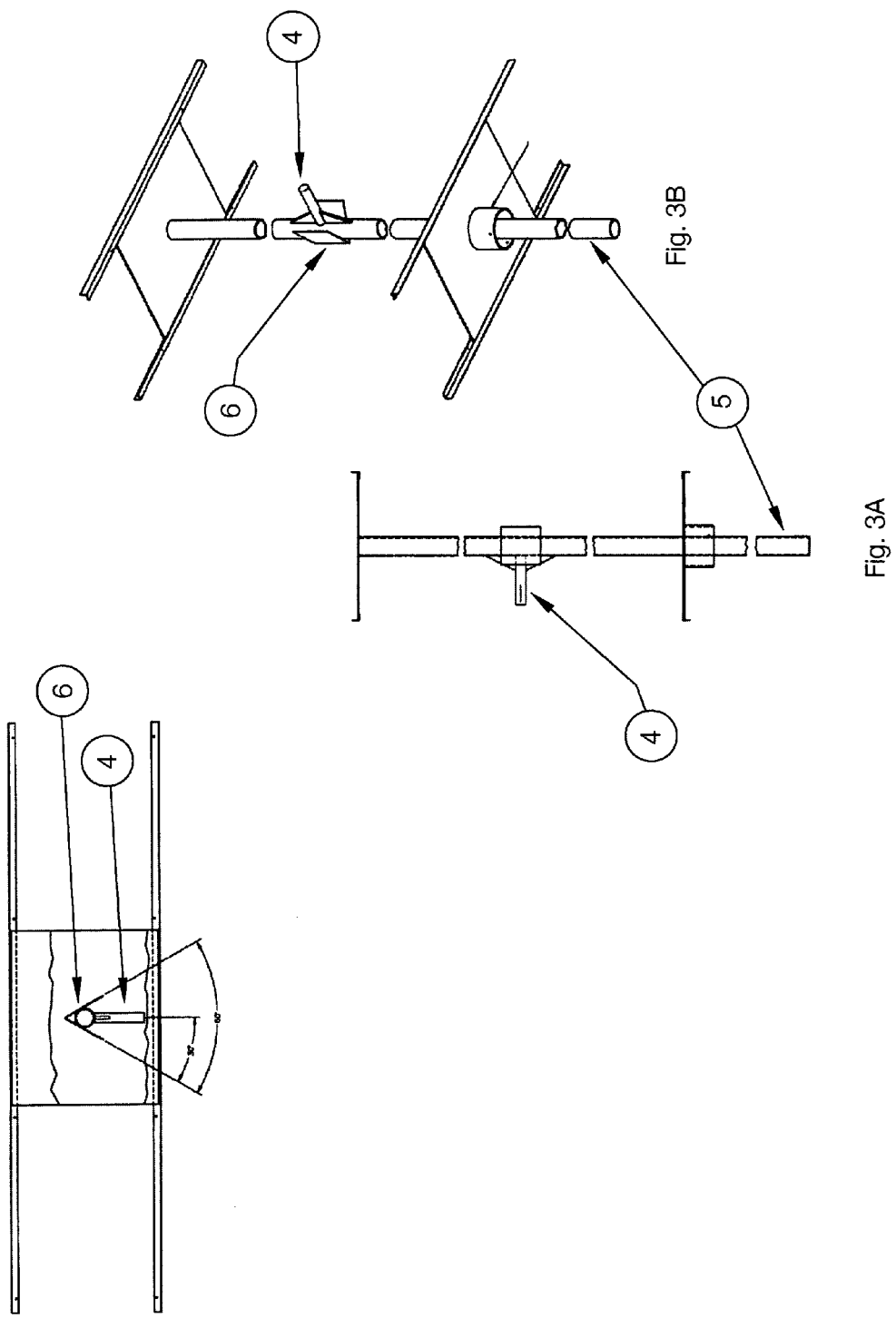

FIG. 3 shows further detail on the cell center pipe mounted V diverter plate, shown in FIG. 1, and how the intake air is diverted into a roughly 60 degree arc, thus acting as a stationary propeller 'spinner,' aerodynamically streamlining the airflow around the center diameter front facing flow blocking planar structure of the fan hub, and the planar disc electric generator, not shown, aft of the fan hub.

FIG. 3A is a side view of the fan center hub spindle, showing the relationship to the center power cell pipe mast.

FIG. 3B is a upward perspective view showing the V input air molecule stream flow diverting stationary V, but rotating equivalent spinner, and that relationship to the center power cell pipe mast fan center hub spindle.

Figures 4, 5:
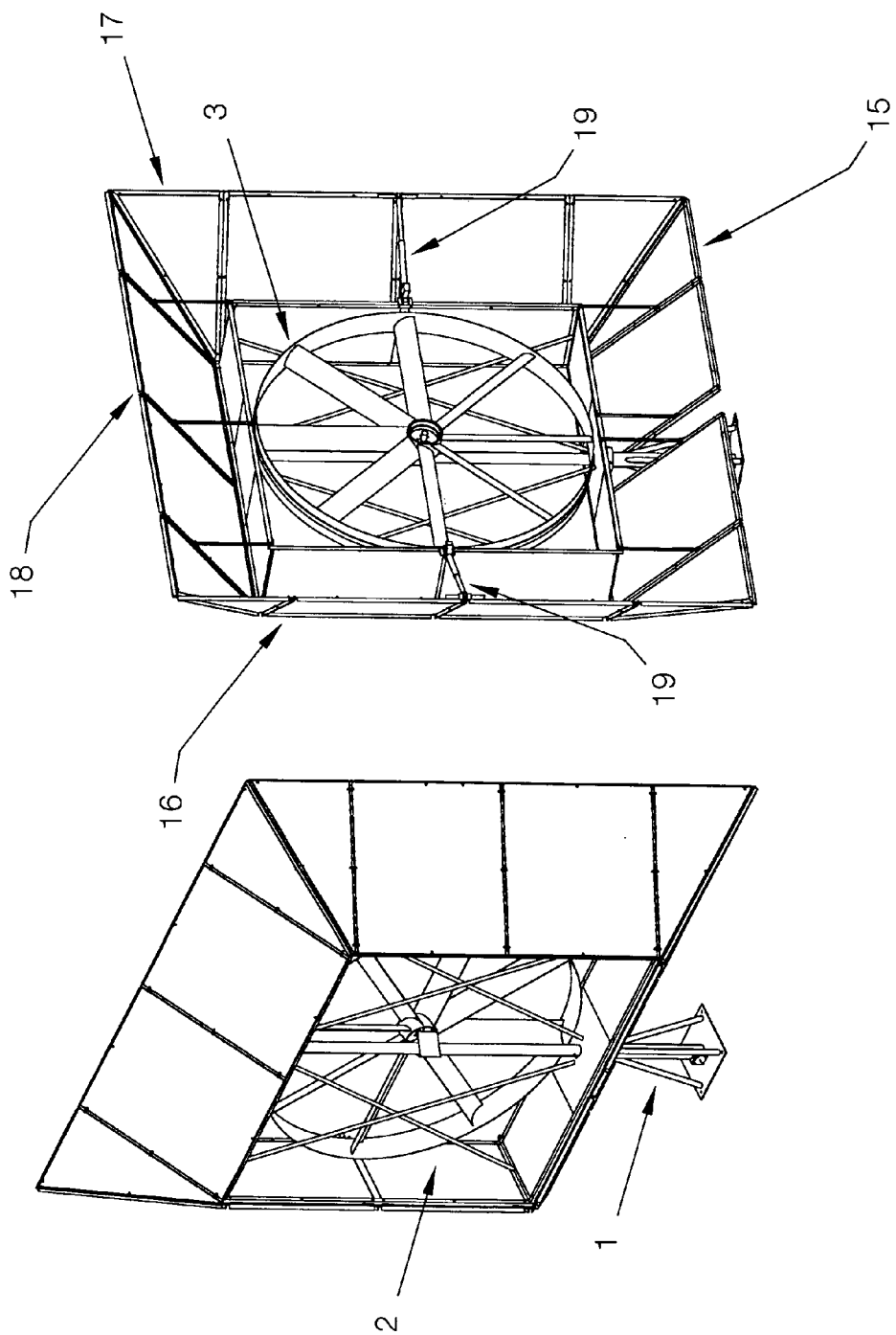

FIG. 4 is a perspective view of the complete DFWT from a front angle, showing the base mount, the fan power cell, with the turbine type fan itself in place, with the addition of the four side, front fan power cell edge mounted and hinged bottom, complementary side, and top flaps also in place. The individual four flap structures can be made of metal or other suitably strong, solid materials, and are covered with an integrated planar, aerodynamic skin system made of fiber composites, metal, wood, or other materials.

FIG. 5 is likewise a perspective view, but from the back side of the complete DFWT, showing the mounting base, the center fan power cell, with the fan mounted on the center hub spindle, further with the bottom, complementary side, and top mounted hinged flap structures in place. The aerodynamic relationships between the extended, planar, solid, but relatively open, or closed to the rear distal edge, front hinged bottom, complementary side, and top planar flap structures, and the fixed solid planar sides of the center fan mounted power cell, are formed from eight individual, but aerodynamically complementary airfoil structures. The leading edge and planar upper surface of the airfoil is formed by the outer surface of the individual flaps themselves, and the partial lower surface, or underside of the flap airfoil structure, with the integrated cusp or cavity formed by the trailing edge of the outer surface of the solid power cell sides. Put another way, the solid flap structures, and the solid sides of the center fan cell housing form four interrelated aerodynamic wing structures.

Also shown in FIG. 5 are the linear electric power actuators attaching midway between the vertical center distal edge of the two flap structures, and the vertical center distal edge of the fan power cell. These extensible electrical actuators allow the angle between the complementary side flaps at the hinged attachment point at the leading edge of the power cell edge structure to be made complementarily, or asymmetrically, side to side, larger or smaller, which in turn results in a larger or smaller exhaust cross-sectional area to the rear of the flap structure, relative to the intake aperture of the DFWT. Identical linear electric actuators, not shown, can also control the relative extension, open or closed of the upper and lower flap structures as well, or the top and bottom flaps can be attached and fixed in such a way that the vertical side flaps pass over the bottom flap, and under the top flap.

Figure 6:
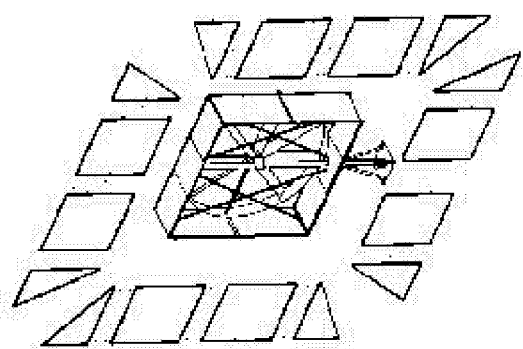

FIG. 6 is an exploded front view of the DFWT showing the complete assembly, base, center fan housing power cell, and flap structures in related piece views.

Figure 7:
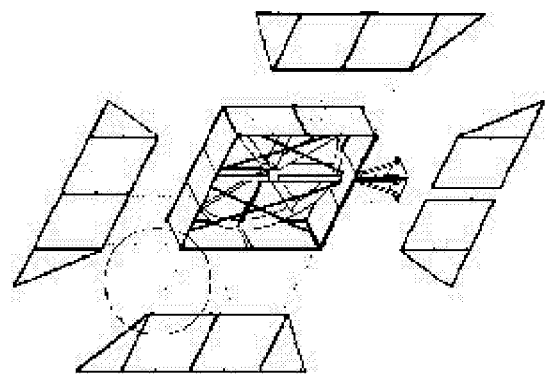

FIG. 7 is an exploded front view of the complete DFWT showing all of the parts and pieces and how the flap structure pieces are attached to each other, and to the hinge points on the leading edge of the DFWT power cell.

Figures 8, 8A:
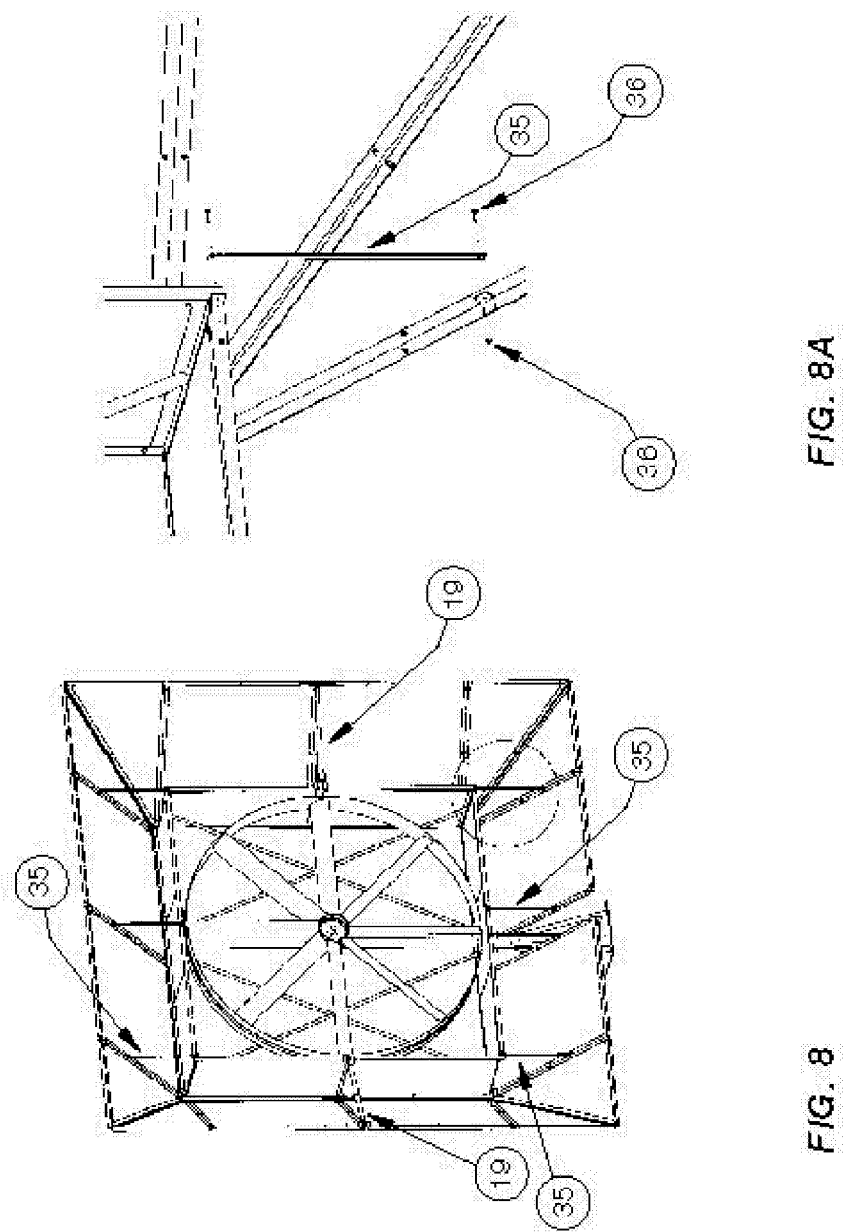

FIG. 8 is a more open, oblique, view of the DFWT from the back, showing more clearly the extensible linear electric actuators, and in FIG. 8A a detail of fixed aperture mounts for the upper and lower flaps.

Figure 8C:
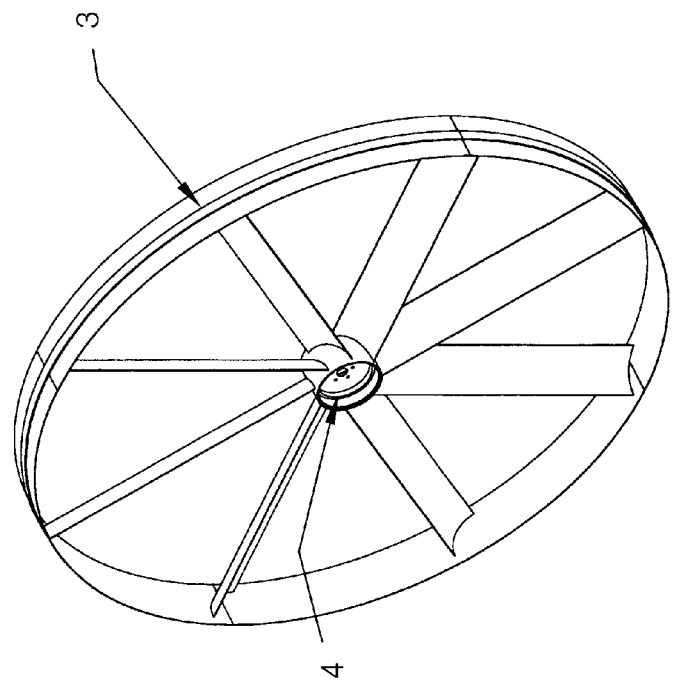
Figure 8B:
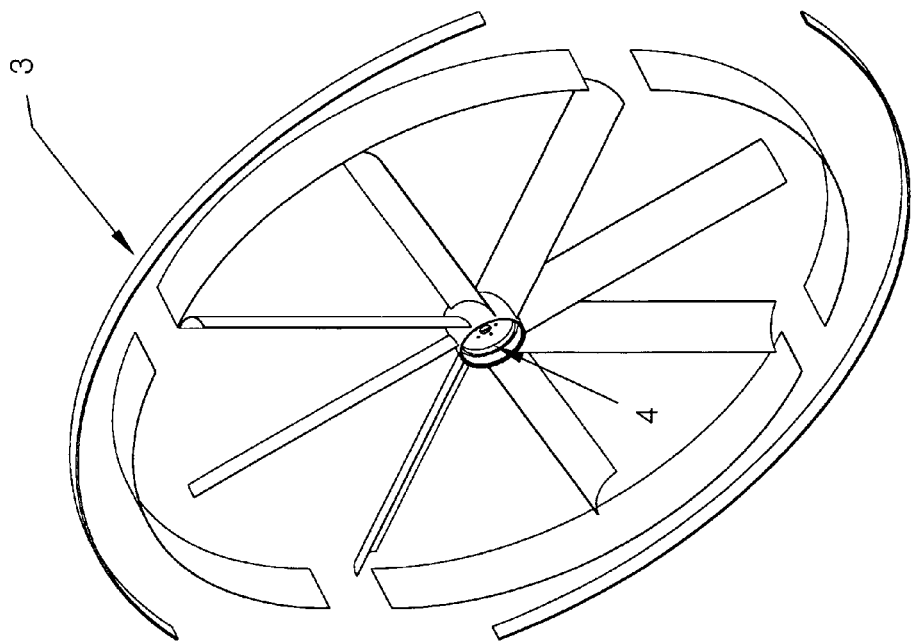

FIGS. 8B and 8C are details of the turbine type fan assembly shown in FIG. 8. Many blade configurations, numbers of blades, and fan blade profiles are possible.

Figure 9:
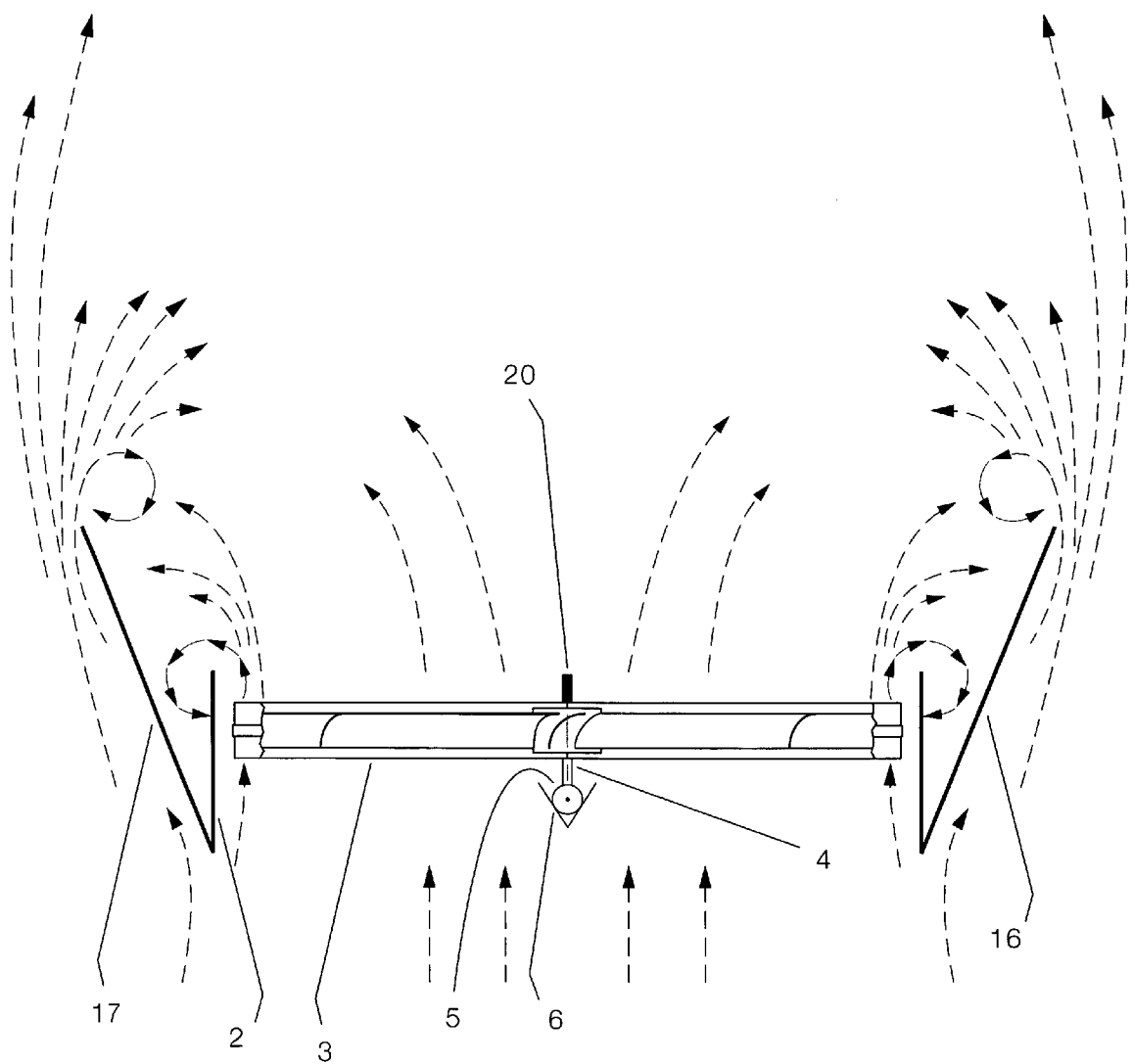

FIG. 9 is a plan view from above showing just the center fan power cell vertical sides, the front attachment points of the fan power cell leading edge, to the front flap edge, and the vertical side planar flap structures themselves, for the purpose of demonstrating the intake cross-sectional area to exhaust cross-sectional area differences in the DFWT.

FIG. 9 also shows the central turbine type fan, and the air molecule stream flow lines as the air mass moves through and over the DFWT airfoil structure. The pressure differentials relative to the exterior surface of the extended DFWT flaps, and the interior surface of said flaps, in combination with the planar sides of the center fan power cell housing further form compressible air molecule volumes causing symmetrical, side to side, and top to bottom cylindrical vortex rotor formation. Further, the trailing edges of the aerodynamic complementary flap and central power cell planar surfaces, in combination with the pressure differentials produce a generalized air molecule stream flow as illustrated by the dashed arrow lines in FIG. 9. For additional clarity, the linear electric vertical flap actuators are not shown in FIG. 9.

Figure 10:
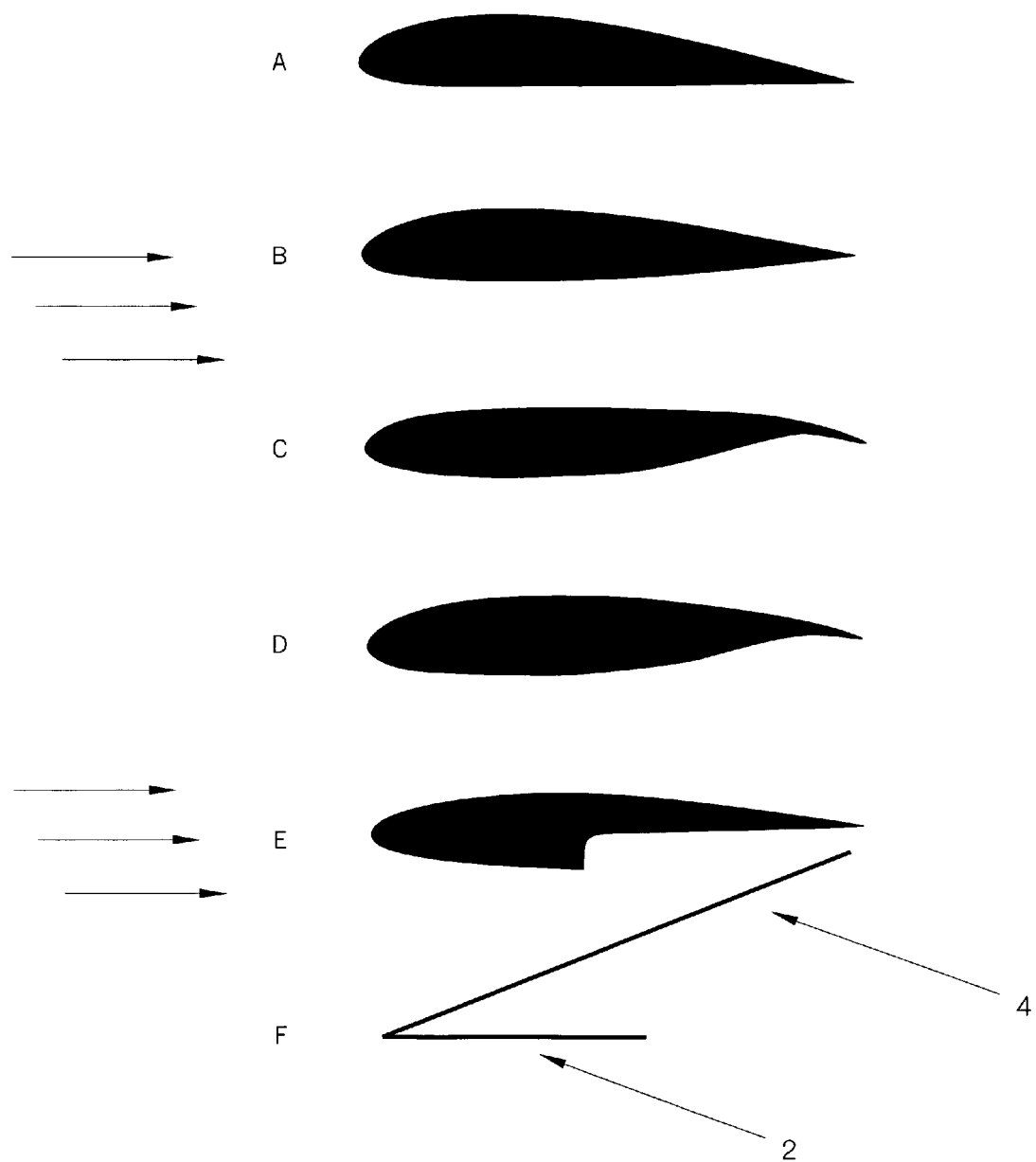

FIG. 10 is a plan view from above showing the input direction of the wind from page left to page right, with a series of typical airfoils, beginning with A. the conventional CLARK 'Y' airfoil, moving to B. a semi-symmetrical airfoil, to C, the Whitcomb supercritical airfoil, to D, a NASA natural laminar flow airfoil, with a blunted leading edge and an underside 'cusp,' to E, the Kline-Fogleman airfoil, to F, the twin complementary airfoils of the DFWT formed by the cell sides, and the front cell, front flap hinged extended flap structures. As can be seen in the drawings, airfoil F. is an outline of the conventional 'solid' airfoils, having an interior volume open to pressure from the air mass in transit over the airfoil top and bottom elements.

Figure 11:
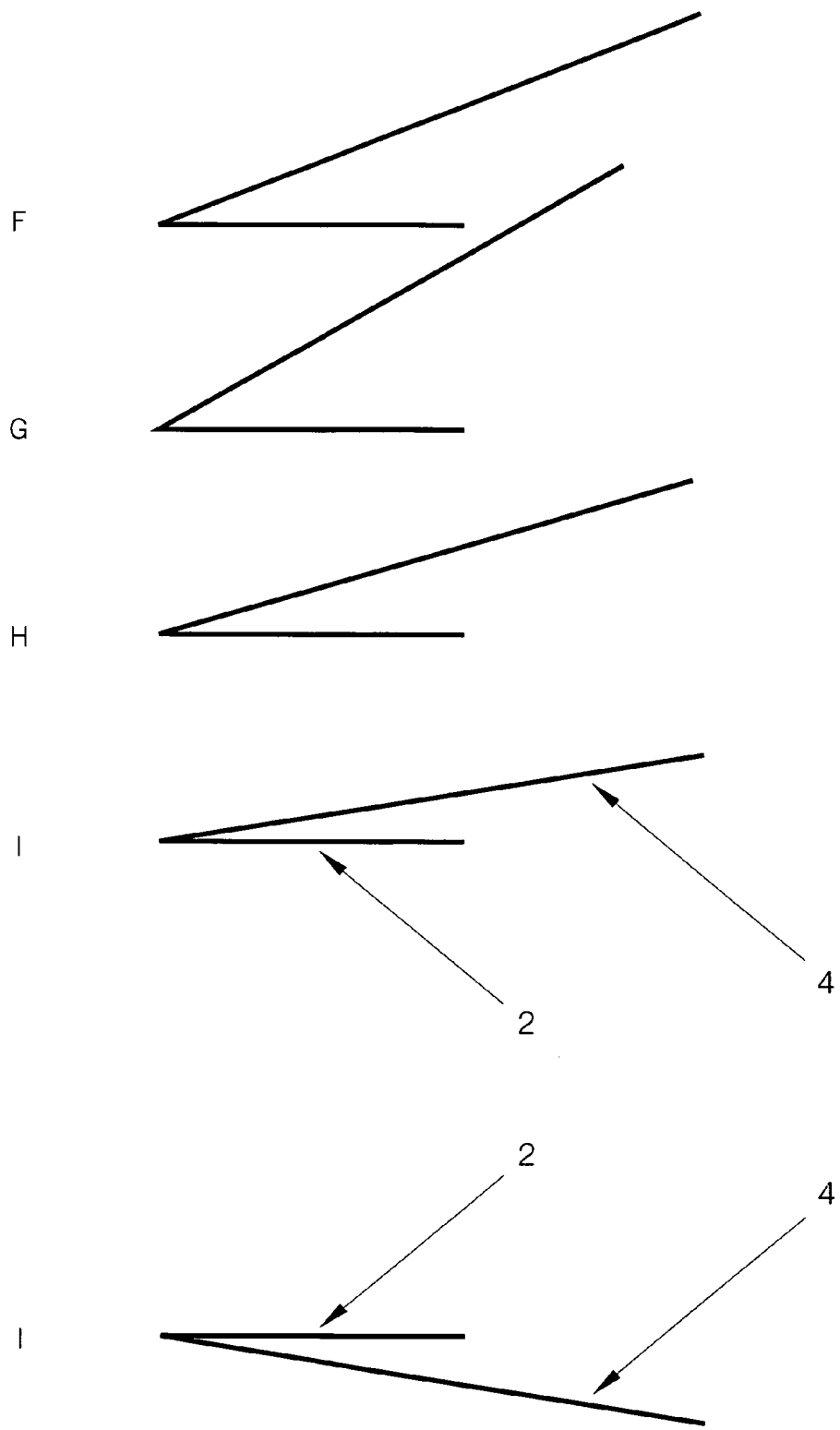

FIG. 11, F through H simply shows the outline airfoil in various degrees of flap extension, raising or lowering the airfoil angle of attack. The letter I airfoil, with the 'can be identically configured' complementary facing airfoil letter I replicates the general airfoil pattern of FIG. 9, showing the airfoil type genesis of the letter I airfoil to both conventional airfoils earlier cited, and the complementary stream flow behavior of the letter I type airfoil also ion FIG. 9.

Figure 12:
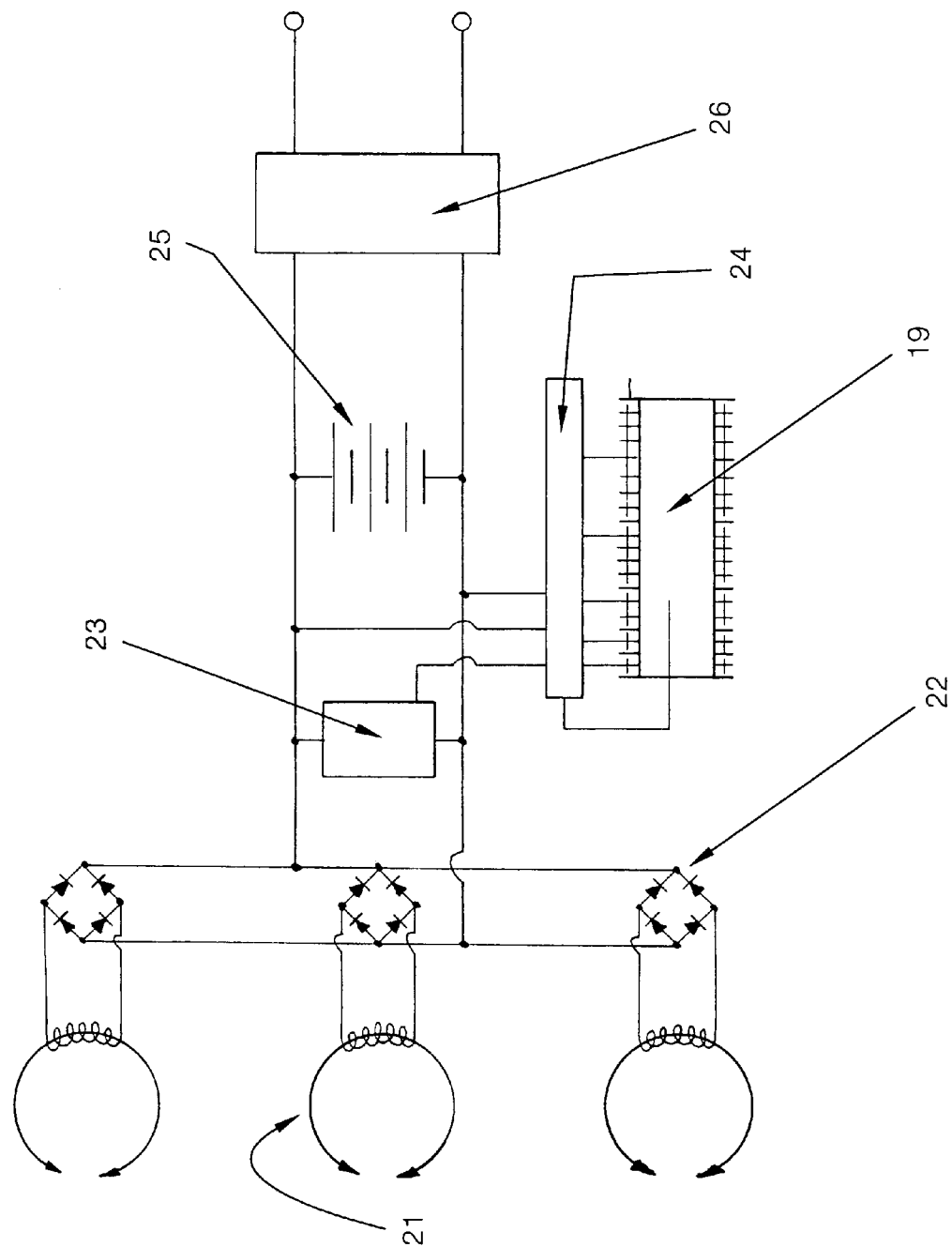

FIG. 12 shows a high voltage seeking logic controlled electronic circuit controlling the linear electric flap actuators. Sensors detect the highest rotational velocity of the fan, which corresponds to the highest voltage output from the sensors. The fan speed for any given wind input is controlled by the relative difference between the exit aperture and the entrance aperture of the DFWT system. An amplifier driven by the logic circuit of the power controller activates the linear electric actuators, which then open and close the vertical side flaps, and the top and bottom flaps, constantly seeking the highest voltage and thus the highest rotational fan speed.

Figure 13:
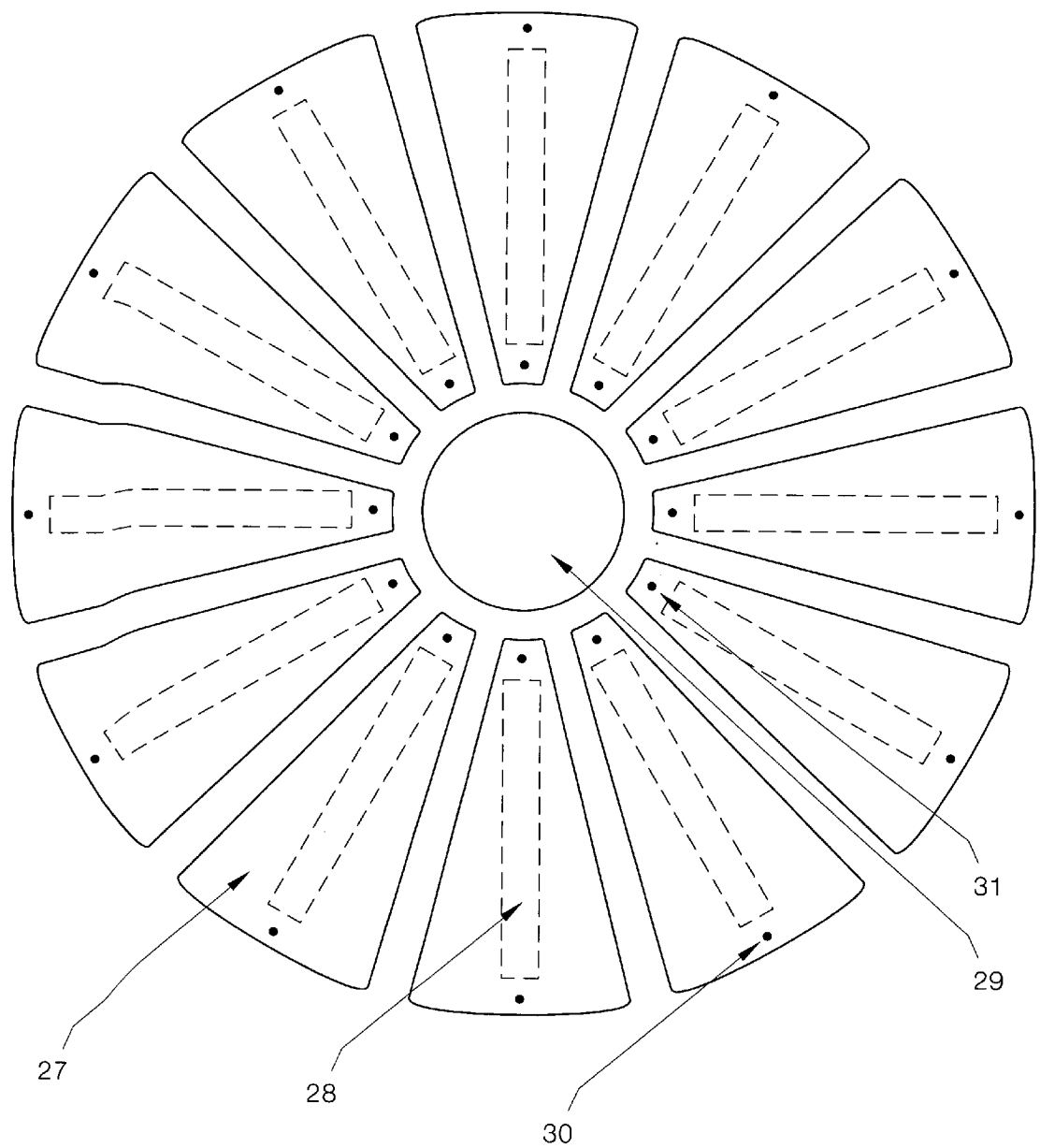

FIG. 13 is a straight down plan view of the pie wedge element solid structure segmented generator stator, with the top and bottom mounted synchronously rotating neodymium-iron-boron, NIB, permanent magnet rotor structures shown as dashed lines on the top side.

Figure 14:
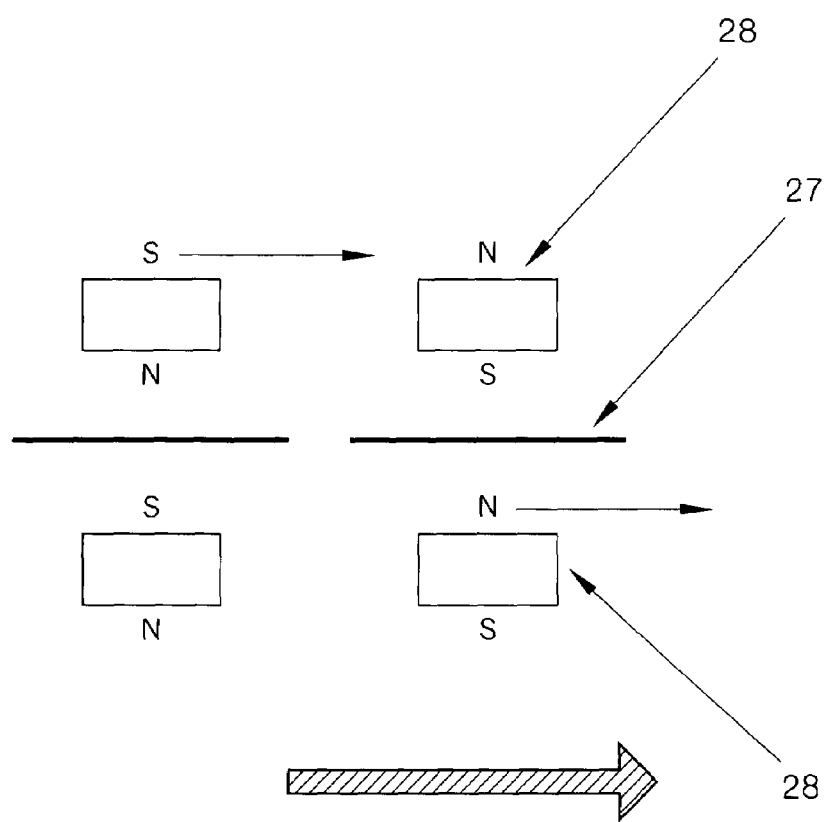

FIG. 14 is a side edge on view of the pie wedge element segmented stator neodymium generator, showing the stators between complementary rare earth magnet pair rotors. Magnetic field lines are not shown, but by convention they exit N poles, and enter S poles.

Figure 15:
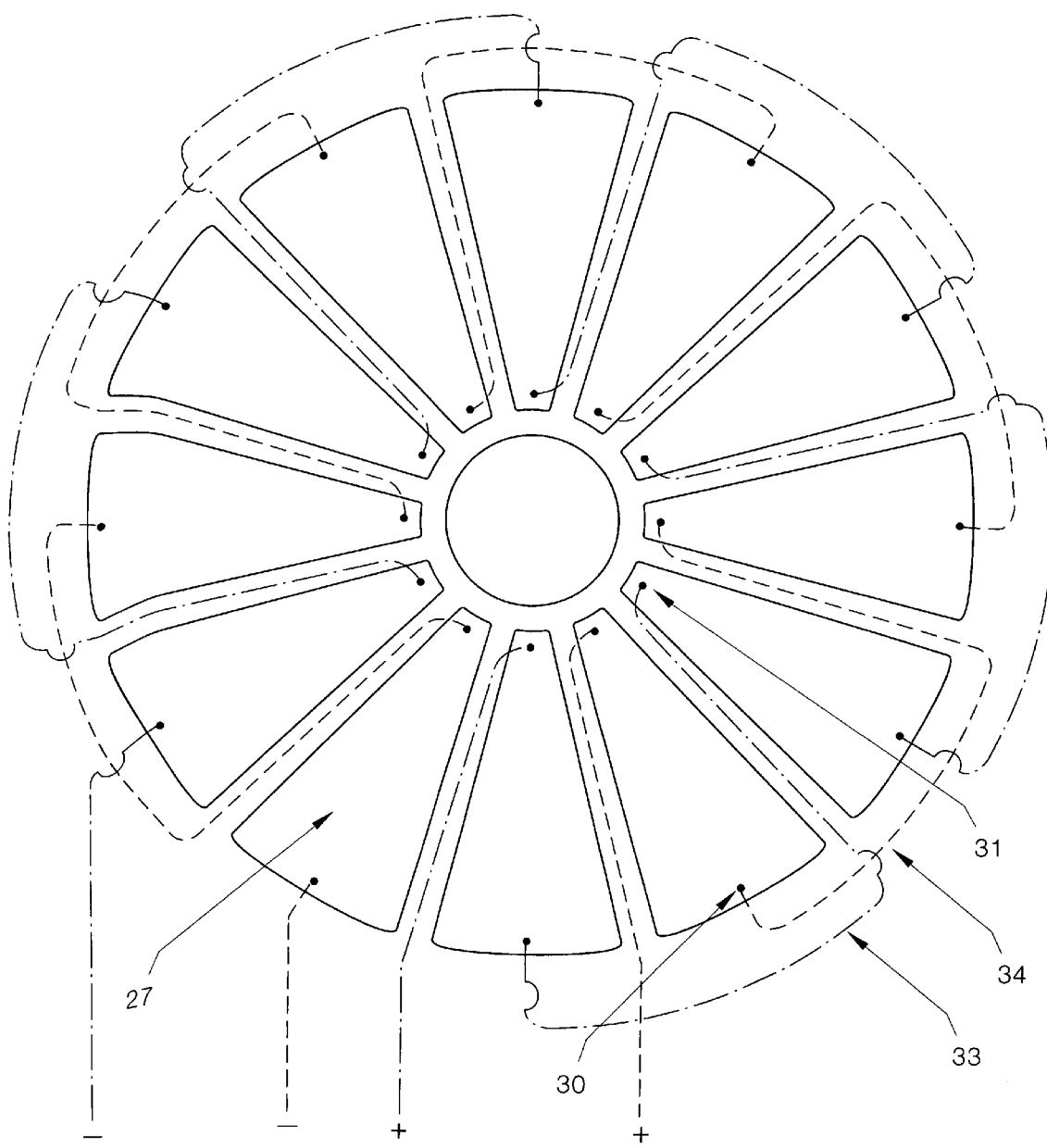

FIG. 15 is a top down plan view of the segmented solid element stator neodymium generator, showing two of many possible stator segment electrical interconnections.

Figure 16:
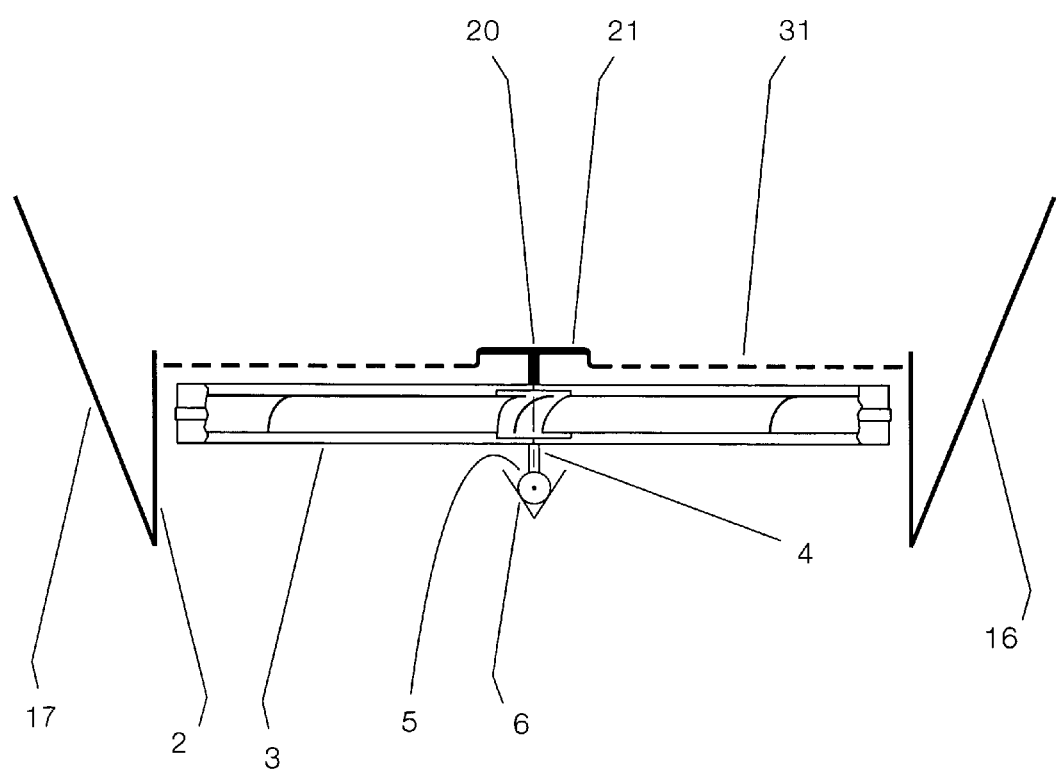

FIG. 16 is another plan view of the low internal impedance, high efficiency generator matched to the shaft drive of the DFWT.

DESCRIPTION OF PREFERRED EMBODIMENTS

Considering the drawings, wherein like reference numbers denote like parts throughout the various drawing figures, reference numeral 1 is directed to the foundation base of the center fan power cell of the DFWT according to the present invention.

In essence, and with respect to FIG. 1, the center fan power cell assembly itself is denoted by the numeral 2, with the turbine fan assembly itself, denoted by the numeral 3, to be attached to the welded hub spindle, denoted by the numeral 4, welded to the center cell power pipe mast denoted by the numeral 5, around which the incoming air mass diverter, spinner equivalent V plate is denoted by the numeral 6. As can be seen in FIG. 1, the center cell pipe mast fits within the center pipe of the foundation base pipe, the open top aperture of which is denoted by the numeral 7. FIG. 1 also shows the generator 21, power output wire 8 traveling through the inner fan power cell mast pipe 5, and also through the mounting base assembly outer pipe 1 on down to the electrical output box 9. The MERCOTAC™ type rotating mercury wetted relay makes it possible for the DFWT upper assembly, center fan power cell, 2, and associated attached flaps, 15 through 18 to rotate freely thorough a full 360% circle and more, without winding up or twisting the generator power output wire, or any other signal and control wires passing through the rotating mercury wetted relay.

FIGS. 1A, and 1B respectively show the exit of the generator, 21, output power wire, 8, and symbolically any other wires, from the bottom inside of the fan power cell assembly, 2, and the exit point of the power wire, 8, out through the base, 1, electrical output box, 9.

In essence and with respect to FIG. 2, the foundation central pipe base of the center fan power cell, denoted by the numeral 1, is shown in a larger perspective view, allowing the further detail of the protective, open aperture, numeral 7, top welded collar, denoted by the numeral 12, terminating the foundation base, numeral 1, within which welded collar, is mounted the TIMKEN™ type tapered roller bearing race, denoted by the numeral 13, concentrically riding upon which is the TIMKEN™ type roller bearing itself, denoted by the numeral 14, allowing the free rotation of said center power cell pipe mast, numeral 5, within the open aperture of bottom base pipe, already denoted as numeral 7. Also shown in FIG. 2 is an Ultra High Molecular Weight, UHMW, bearing collar or sleeve, 11, which is attached near to the bottom of the fan power cell mast pipe, 5, on the exterior circumference, from which location it forms a bearing seal with the outer surface of the outer pipe forming the base support 1.

The second perspective drawing, FIG. 2A, simply shows numerically denoted pieces 13, the roller bearing race, and the TIMKEN™ type tapered roller bearing itself, number 14 placed within the open aperture of the centrally located pipe of the DFWT mounting base, number 1, through which assembly passes the center power cell pipe mast, number 5, which is then supported by, and allowed freely to rotate by the concentrically located TIMKEN™ type tapered roller bearing assembly.

Not shown in this FIG. 2 is the electrical cable carrying the power output of the generator, passing down through the interior of the center power cell pipe mast denoted by the numeral 7, and the interior of the mounting base center pipe, denoted by the numeral 1, although the power output cable, denoted by the numeral 8, is shown as exiting the bottom cell base mounting pipe in FIG. 1A, and as exiting the electrical output box, denoted by the numeral 9 in FIG. 1B, and as passing through the concentric fan power cell mast support pipe, 5, and the center pipe of the base, 1 in FIG. 1.

FIG. 3 is a top down plan view showing the approximate input air molecule diversion pattern to either side of the spinner equivalent diverter plate, denoted by the numeral 6, which extends according to pressure measurements, 30 degrees to either side of the horizontal power turbine fan mounting spindle, 4, perpendicular to the vertical center power cell pipe mast, 5, for an equivalent 60 degree input air molecule diversion pattern reward around the turbine fan center hub to which the turbine type fan blades are attached.

FIG. 3A is a plan view from the side further demonstrating the exact relationship among the perpendicular fan hub spindle, 4, the vertical center fan power cell pipe mast, 5, and the intake air mass V diverter plate, 6.

FIG. 3B is a further perspective view showing the exact geometrical relationship among the perpendicular fan hub spindle, 4, the vertical fan power cell pipe mast, 5, and the intake air mass diverter plate, 6.

FIGS. 4 and 5 show all of the previously numerically denominated and described DFWT pieces fitting together, with the addition of the front edge center fan power cell hinged flap structures, four in all, numerically denoted as follows, all viewed from the rear; number 15 for the front fan power cell hinged bottom flap, numbers 16 and 17 for the left side vertical flap and the right side vertical flap respectively, and numerically denoted number 18 for the top flap. FIG. 5 further contains a view of the electrically powered linear actuators, denoted and described as number 19 left, and number 19 right, as all actuators are identical, driven by a fan rotational velocity, voltage differential expressed circuit described in FIG. 12, seeking the highest rotational velocity, thus the highest RPM, and further thus the highest voltage, and finally thus the highest power output. Because the bottom, complementary side, and top front hinged flap structures are all hinged at the leading edges of the central fan housing power cell, although linear actuators are shown only for the vertical side flaps, 16 and 17, the hinged attachment points of the electrically driven extending and contracting linear actuators, 19, cause the four flap structure, 15 through 18 to move away from, when the actuators, 19, are extended, the sides of centrally located fan power cell, or to move toward, when the actuators are retracted, the same centrally located fan power cell sides. Thus, in the actuator extension example, the effective cross-sectional area of the air mass volume exhaust is increased: in the actuator contraction instance the cross-sectional area of the air mass volume exhaust is decreased. The ratio between the fixed intake aperture, and the configurable exhaust aperture creates a volume and thus a velocity differential in the air mass on either side of the relatively centrally located in the duct turbine type fan, 3. The total duct system thus constitutes a fixed intake aperture feeding a configurable exhaust aperture through a volume and volume velocity driven turbine type fan, 3. Since the intake aperture is fixed, a larger but still duct wall defined and confined air mass must undergo a velocity step up when moving into a larger volume exhaust terminated aperture, according to the Bernoulli or venturi principle. Furthermore, the larger, and volume configurable duct volume behind the fan represents a volume into which the fixed intake aperture air volume is fed, thus representing a diffusion of the intake air mass, and a consequent pressure drop in the duct behind the turbine type fan. Said pressure drop in the fan duct exhaust side creates in turn an increase in the intake air mass velocity, and an ideal increase in fan rotational velocity, as the volume in the exhaust side of the duct is configurable, and thus can be ideally matched to any intake air mass volume according to the speed of the wind at any given time.

FIG. 6 shows the piecewise relationship of all of the hinged flap pieces of the flap structures 15 through 18 and their further piecewise relationship to the fan power cell base, 1, and the fan power cell itself, 2, all defined respectively in the specific enumerated DFWT parts number sequence 1 through 18. FIG. 7 further shows the specific flap number sequence 15 through 18 parts, as attached to one another, and as attached to the central power fan cell structure, 2, which is in turn resting on and attached to the mounting base 1, with all the parts and assemblies as described above. Circle A enclosing dashed lines and not enclosing other dashed lines shows points of attachment between the flap structures, number sequence 15 through 18, and the center fan power cell, number 2.

Now, with respect to the hinged flaps, 15 through 18, and their hinged attachment points to the square fan power cell sides, 2, the bottom, side, and top flaps, number sequence 15 through 18 respectively, these individual flaps have different individual functions with respect to the aerodynamic DFWT whole illustrated in FIG. 9. Bottom flap 15 serves to form a defining side and terminating cross-sectional area boundary, sealing the structure of the rearward duct until the trailing edge termination, a role which all of the hinged duct pieces fulfill equally. Bottom flap 15 has a further function, however, which is to impart dynamic lift to the entire roof mounted DFWT, and to pitch the structure somewhat forward, against the windward side DFWT input force which tends to push the entire structure rearward, flexing the double pipe mounting system against the mounting base, 1. To fulfill this lift function, the bottom flap, 15, as it is hinged, is capable of being linear actuator driven, imparting more or less dynamic lift to the entire DFWT assembly. As the center power cell pipe mast, 5, is rigid, and further fits concentrically within the mounting base center pipe, 1, through the top open aperture 7, said inner and outer pipe concentric assembly constitute an inner pipe bearing, resting upon tapered roller bearing assembly, 12 through 14, forming a freely, fully 360 degree plus rotationally capable mounting system benefiting safety wise, and structurally at the base from a concentrically double pipe wall thickness. Since the bottom flap, 15, is most proximate to the coplanar rooftop surface, it is operating in a pressure zone in which lift is magnified, as it is itself a horizontally oriented flying, lift capable surface. If a mass sensor were installed within the DFWT, the pitch angle of the bottom flap, 15, could be configured within a mass sensing feedback loop, to partially, or totally offset the mass of the entire DFWT, as the inner center power cell pipe mast is 'floating' within the bass mount outer pipe, although resting statically, in an aerodynamic condition of no lift, within the bass mount outer pipe, on the taper roller bearing assembly, 12 through 14.

Vertically oriented side flaps, 16 and 17, serve to steer the DFWT assembly into the wind, as they represent air pressure driven lever arm extensions, acting as torque exerting elements on the central base mount pipe, 1, and the tapered bearing elements, 12 through 14. These air mass velocity, voltage expressed, linear actuator controlled, 16 and 17, vertical left and right side flaps respectively, can be configured symmetrically, or asymmetrically; asymmetrically in rooftop mounting instances where air pressure offsetting forces could exist because of a proximate building structure such as a chimney or other structure could direct lateral air molecule forces against the DFWT. In nearly all normal cases, the side flaps, 16, 17, the horizontal intake attitude steering flaps would be extended from the center fan cell sides, 2, in an identical manner, so that the intake aperture of the fan located center power cell 2 would be directly oriented into the wind. Vertically oriented side flaps, 16 and 17 also function, as do all the extensible four flaps, to seal the effective duct boundaries to the trailing edges of the duct. Since the steering function imparted by vertically oriented flaps 16 and 17 is separable from the lifting function embodied by horizontally oriented bottom flap 15, and the further lift controlling and rear edge duct sealing function embodied by top hinged flap 18; vertically oriented side flaps 16 and 17 are capable of passing over bottom flap 15, and under top flap 18, preserving the rearward flap terminating side to rear edge duct seal, but allowing steering functions separate from bottom to top lift and lift control functions to be established.

FIG. 8 is another oblique perspective view from the back of the DFWT, showing vertical side flaps, 16, and 17, attached and moveable via the linear electric actuators, 19, to the leading edge sides of the central fan power cell 2. Also shown in FIG. 8, and in greater detail in FIG. 8A are flap hanger elements, 35, which via nut/bolt hanger mounts, 36, can attach the bottom flap, 15, and the top flap, 18, in a fixed, stationary position. Once an general wind speed were known in a given location, all of the flaps, bottom, 15, left side, 16, right side, 17 and top flap, 18 could be placed in such a fixed position.

FIGS. 8B and 8c show the turbine type fan assembly of FIG. 8 in greater detail. In the turbine type fan assembly, 3, with hub 4, any number of blades of any particular aerodynamic contour and pitch may be used, although some turbine type fan assembly configurations would certainly be more ideal than others, from a power throughput point of view.

FIG. 9 is a top ward down plan view of the DFWT with the elements 2, 3, 4, 6, 16 and 17 drawn to scale, and with the top flap structure, 18, not shown, so that the air mass stream flow patterns through and around the DFWT structure, principally aerodynamic elements 2, 3, 4, 6, 16 and 17 can be examined in greater detail. FIG. 9 shows the aerodynamic pressure wave formation which leads to the formation of vertical cylindrical 'rotors' or 'wrapped' vortices, which are highly coherent efficient rotary air molecule wave formations quickly transiting the intake air masses through the DFWT.

FIG. 10, adapted from page 62 of THE ULTIMATE PAPER AIRPLANE by Richard Kline, ISBN Number 0-671-55551-0 shows the Kline-Fogleman airfoil, represented as E on the page. The present instant airfoil, represented in each of four instances by a side of center fan power cell 2, and by one of four extensible planar flaps, 15 through 18, hinged at each leading edge of center fan power cell 2: each of these unions of a fan power cell side, and a flap, constitutes separately an airfoil, as depicted in sequential figure F in a series of airfoil representations beginning with A, a conventional Clark 'Y' airfoil, and moving through E, the Kline-Fogleman airfoil, as described in the book text referenced above. In the present instant patent application, the four F type airfoils are represented in a square cell, with the flap/lift elements to the outside, the upper/outer wing elements, and the underside wing elements represented by the center fan power cell sides. Thus the elements of the DFWT, the center fan power cell, 2, with four sides, and the four front power cell hinged flap structures, 15 through 18 form balanced and opposed complementary aerodynamic lift structures, in which the lift is expressed as a pressure differential within a rearward expanding duct on either side of a front and rear duct section separated by a centrally located turbine type fan, 3. The relationship between any facing two assemblies, each made up of a fan power cell side, 2, and a flap, 15 through 18, is illustrated in FIG. 11 letter I, where two assemblies are show facing each other. The other elements in FIG. 11, F, through I demonstrate the variable airfoil profile possibilities inherent in the front edge hinged airfoil structure.

Further, the air mass stream flow which passes through the DFWT duct itself does not expand a the same rate as the air mass stream flow which passes over and around the outer structure of the DFWT, as shown in FIG. 9. Sharp stepwise discontinuities, represented by the trailing edges of the four planar side elements of the central fan power cell, and the constantly expanding inner side of the extensible flap structures, 15 through 18, introduce rotors, or rotating cylindrical vortices between each turbine fan power cell assembly, 2, and each planar trailing edge, and open, lower pressure expanding volume, planar surface of the inner flap, 15 through 18, surfaces. Furthermore, there is a sharp stepwise discontinuity at the trailing edge of each flap, 15 through 18 planar structure, where the air mass inside the rear sides of the duct is within a larger volume that the air mass forward of the fan in the entrance side of the duct, and thus at a lower pressure. This inner, rear, duct air mass merges at the termination of the flap defined duct, with the high velocity air moving over the constantly expanding sides of the outer duct, 15 through 18, which air molecule elements merging in flap trailing edge planar and cylindrically expressed rotors, facilitating the rapid passage of admitted air through the short and highly pressure variable duct sections.

The duct transit air mass stream flow, while deliberately not laminar, is nevertheless highly organized into complementary center fan power cell, 2, and interior expanding volume, and trailing edge flap, 15 through 18 planar pressure induced cylindrical rotors or vortices, which are highly coherent wrapped waves, and thus enters and exits the DFWT duct system in a highly predictable, coherent and efficient manner.

FIG. 12 is a block schematic view of a typical voltage seeking linear actuator driving circuit. The DFWT planar rare earth magnetic generator 21 is shown as typically driving a diode bridge, 22, and then a voltage sensor, 23, which in turn feeds a logic and power amplifier circuit, 24, which is a voltage comparator. This logic and power amplifier circuit in turn provides power to the two linear electric actuators, 19, which drive the two vertically oriented side flaps, 16 left, and 17 right respectively, when viewed from the rear of the DFWT. The power output of the generator, 21, is sensed, with the linear electric actuator circuit constantly active in a 'seek' mode for the highest voltage output from the generator, 21. FIG. 12 also shows the storage capacitor circuit, 25, and the output inverter, 26, which matches the DFWT power output to either a stand alone, or a utility load.

FIG. 13 shows the twelve equal size solid copper or copper alloy, or other suitably conductive metal, or other conductive material, pie wedge segments, denoted by the numeral 27, which form the conductive stator of electric generator 21. Twelve pie wedges, 27, are shown in this FIG. 13, although many other numbers of pie wedge segments, 27, elements, could be used as well. If the circle described and divided by the pie wedge segments, 27, were solid and undivided instead, the conductive stator would resemble the solid rotor in the classic Faraday Unipolar Generator. Any number of pie wedge conductive stator elements, 27, larger than 1, therefore, would represent a departure from the classic Faraday Unipolar Generator, with the potential, with an increasing number of pie wedge segments, 27, of an increasing voltage output. These X number of pie wedge conductive stator elements, 27, may be interconnected in many different ways, via the expedient of attaching conductive connecting wires at a point near the center apex, 31, of each individual pie wedge segment, element, 27, and at a point near the outer circumferential edge, 30. If for example, all of the pie wedges, 27, were connected in series, then the effective resistance of the entire pie wedge circuit would be twelve times larger than if all of the pie wedges, 27, in the entire pie wedge circuit were connected in parallel. From a DFWT air molecule input source point of view, maximum power transfer efficiency will occur through the entire DFWT source to load circuit if the power load through the generator is ideally matched to the input source, the air molecule source itself. Since the air molecule source constitutes a low internal impedance source, this source is best matched to a low internal impedance generator load, which in turn can be matched to a typical electrical building load or utility load through transformers, or other means, prior to a typical inverter. The rare earth permanent magnet, conductive pie wedge generator, 21, while not having the fractional internal impedance or net resistance of a Faraday generator, nevertheless is very robust, and has a lower characteristic internal impedance, and net resistance than a generator using wire wound elements in place of the solid conductive pie wedges of the instant generator.

FIG. 14 shows the completing elements of the instant generator 21: the matching Neodymium-Iron-Boron multiple paired magnet rotor arrays, 28, facing each other on either side of each conductive pie wedge stator element, 27, a pair for each conductive pie wedge stator element. These N-I-B magnetic arrays are maintained in place by suitably rigid non-magnetic structural discs, which maintain the physical spacing relationship between the conductive pie wedge stator elements, 27, and the N-I-B magnet arrays, 28. Any series parallel connection among the various pie wedge stator elements, 27, is possible, but some interconnections are more ideal than others. If every other pie wedge stator, 27, is connected in a single series, then there would be two series of six conductive pie wedge stator elements in a circuit using a total of twelve individual conductive pie wedge circuit elements, 27. Further, if the output lead pair of one series were inverted with respect to the other output pair, and further if the permanent magnet pairs were oriented in such a way that the permanent magnet field were attractive between a first pair, based on a N pole to one side of the centrally located pie wedge stator circuit element, 25, and an S pole to the other side: and further, if the next adjacent magnet pair to one side were oriented oppositely from a magnet point of view, so that the N and S poles were oppositely oriented, and further if the permanent magnet rotor elements were actually rotated as they would be in a generator, then said generator, 21, would output two superimposed pulsed DC waveforms, into a suitable array of circuit shaping and forming elements as shown in FIG. 12.

It should be evident that there are many strategies for orchestrating a plurality of conductive pie wedge stator elements, 27, and attractive N-I-B magnet pairs, 28, so that when the magnet pairs rotors are rotated, electrical power would flow out of the stator elements into a suitable load. Moreover, it is further evident that such generator elements could be further stacked into additional interleaved stator, rotor pairs, for additional output power capability. Moreover, having thus described the invention, it should be apparent that numerous structural modifications and adaptations may be resorted to without departing from the scope and fair meaning of the instant invention as set forth herein above, and as defined herein below by the claims.

FIG. 15 shows two possible such circuits, in which one series circuit, 34, is in series with every other pie wedge, 27, disc stator element, with a further series, 33, in which the remaining every other pie wedge segments, 27, are in series with each other. These two series then are combined in parallel, although the output of one series can be polarity inverted to that the output of the two series in parallel together would resemble a pulsed DC output.

FIG. 16 shows the physical attachment of the generator, 21, to the power shaft, 20, of the generator, which generator is in turn attached to the inside of the center fan power cell, 2, through suitable strong means, shown by dashed lines 31.

What is claimed is:

1. A Ducted Fan Wind Turbine, hereinafter and before, DFWT, device for safely and quietly producing electrical power without added induced mechanical vibration from an air molecule mass/velocity throughput, standing alone in a field or in multiple DFWT devices in the field combinations: and most especially to be mounted on turbulent, windy, building tops, with augmented increased wind input stream flows measurably typical of the tops of buildings and other structures, comprising, in combination:

a turbine type, dynamically mass balanced multi-bladed fan located with an aerodynamically regular and balanced duct, said duct configured as a regular four solid sided short square, open to the front and the back through a very highly air molecule porous metal or other relatively permanent, strong mesh to prevent the ingress or egress of objects of any size and type into or out of the fan power cell, with four externally affixed and mounted flap structures, hinged to each other in such a way that the front aerodynamically leading edges of the flap structures and the aerodynamic leading edges of the four sided centrally located fan power cell are hinge attached to each other and coincident;

means in each said DFWT device to alter the exit aperture air molecule volume, or equivalent cross-sectional exit aperture of said DFWT device, via the expedient of extensible electrical or other operational linear actuators, by which the planar surface of said flaps may be extended further away from or nearer to the solid planar sides of said central power fan square, so that the ratio of the duct entrance cross-sectional area, to the duct exit cross-sectional area may be varied to achieve the highest possible fan rotational velocity; a voltage is sensed via a voltage/velocity electrical signal derived from an integrated fan shaft mounted N-I-B generator electrically transmitted to a logic controlled power amplifier comparator from which electrically controlled linear flap actuators are powered.

2. The device of claim 1 wherein said center power fan square with attached leading edge flaps, through which a vertical fan mounting pipe extends well beyond the bottom power cell planar surface, attaches via the expedient of said projecting power cell pipe into a outer larger diameter, base mount pipe on the top of which is situated a TIMKEN™ type tapered roller bearing in such a way that the center fan power cell, together with the leading edge hinged attached flaps may freely rotate thorough a full 360 degrees and greater without compromising the fan shaft attached electrical power generator from which an electrical cable extends onto a stationary voltage detection and inverter structure; said electrical connection to be through a MER-COTAC™ or other type of high electrical conductivity, low loss rotating mercury wetted or other type relay, so that said DFWT with integrated internal wiring may rotate freely through more than 360 degrees without compromising the need of said throughput electrical wiring to attach finally to a stationary and fixed termination; said base pipe is connected to, and supported vertically by a flat, planar, extended steel or other strong material plate, or equivalent attachment means, through which means the DFWT unit may be firmly attached to any strong roof or other surface element of a building or other structure.

3. The turbine type DFWT device of claim 1, in which a nested structural, rotation capable concentric upper cell inner pipe, and lower base pipe outer attachment, with integrated TIMKEN™ type tapered roller bearing, and high conductivity rotation capable relay, form a double wall nested pipe mast structure, tested, and testable to be capable of safely withstanding any wind load which the building itself is capable of withstanding.

4. The turbine type DFWT device of claim 1, in which the extended planar sides of the regular four sided square fan containing power cell, in leading aerodynamic hinged edge conjunction with the extended planar surfaces of the four extended flaps creates a variable volume behind the turbine type central fan, which variable volume in conjunction with sharp trailing edge planar surface discontinuities of the power cell sides, and the trailing edge discontinuities of the flap edges, results in the formation of aerodynamic trailing edge vortices, which cylindrically shaped vortex rotors facilitate the more rapid and efficient exhaust of input air mass/velocities through the DFWT system when compared to the frictional losses and flow limitations of traditional laminar flow methods, in which stream flows adhere to and track extended planar surfaces, in previously patented ducted fan and structure augmented wind turbine fan designs; said cylindrically shaped vortices may be made larger or smaller, more or less transit capable and energetic via the expedient of the intelligent opening and closing of the extended planar flap structures relative to the fixed position of the extended planar sides of the centrally located fan power cell.

5. The turbine type DFWT device of claim 1, to which said central power shaft of said balanced turbine type fan is attached a Neodymium-Iron-Boron, N-I-B, type permanent magnet pancake type generator, in which centrally located solid pie wedge stator conductive elements can be configured in any number of series parallel combinations, to be driven by extended co-planar complementary attractive facing rotor pairs of said N-I-B magnets arranged in a single pair per pie wedge conductive stator element configuration; since the fan rotational velocity expressed as a voltage output of said low input impedance N-I-B type generator depends upon the rotational velocity of said turbine type driving fan, the output of said generator can be sampled to form the input to a logic controlled rotational velocity to voltage comparator which in turn drives power amplifiers which in turn individually drive each of one, or two, or three, or four of two horizontally oriented, and vertically oriented, linear electric actuators, which open and close attached flaps relative to fixed power cell extended planar surfaces, so that the cylindrical vortex augmenting air molecule mass/velocity driving elements can be variously and individually controlled via individual, or paired flap extensions.

6. The turbine type DFWT device of claim 1, in which a bottom horizontally oriented flap can be pitched outward, down, or relatively inward, up, in order to produce more or less lift in co-planar conjunction with the roof top extended planar pressure zone, so that the relative mass of the DFWT, and the tendency of the entire DFWT unit to pitch backward against the concentric double nested rotationally capable pipe attachment to the base, can be off set dynamically by the lift generated by said bottom flap.

7. The turbine type DFWT device of claim 1, in which a top flap can further control the relative lift of the DFWT device, generated by a bottom flap, to offset the static mass of the DFWT and the backward pitching tendencies of the DFWT unit against a central support pipe and bottom base attachment.

8. The turbine type DFWT device of claim 1, in which said four complementary leading power cell hinged flaps form a configurable duct, in which all four sides may be independently configured alone, in response to an asymmetric input air mass force, or configured dependently together; both types of configurations to be logically evaluated by the rotational velocity to voltage sensor, as to whether or not any given independent or dependent configuration results in greater or lesser power output through the system.

9. The turbine type DFWT device of claim 1, in which four normally identically configured leading edge attached flap structures form a truncated pyramid structure, attached to an interior open front and back square, in which the four regular, normally identically oriented sides of the pyramid are truncated into a frontward opening, and terminated aft ward by another opening, the cross-sectional area of which depends upon the relative angle of each exterior flap element to the planar out sides of the interior square; the aerodynamic characteristic of such a horizontally oriented truncated pyramid structure is that of a constantly expanding exterior volume relative to a partially fixed, but aft ward limited interior volume, with the face on into the wind steering characteristic of a pressure controlled vertical lifting surface, symmetrically drag normalized in two planes, in which the vertically generated lift is expressed as a torque moment inwardly against a rotation capable bearing; laterally dispersed, to either side extreme, vertically oriented lift elements form drag force induced torque moments tending to instantaneously orient the open front aperture of the DFWT directly into the wind against the rotational velocity generated, bicycle wheel gyroscopic moment of the fan rotation itself.

10. The turbine type DFWT device of claim 1, in which four normally identically configured leading edge flap structures form a truncated pyramid structure, attached to an interior open front and back planar side square, the truncated pyramid structure open front and back, with the front cross sectional area in front of the fan fixed, and with the rear ward, back, cross-sectional area configurable as to cross-sectional area, and increasing or decreasing interior volume, with the further aerodynamic purpose of providing an equivalent flap edge to edge seal, so that the air mass in transit through the duct, behind the fan, may be maintained without side edge leakage, and consequent duct interior and exterior pressure equalization prematurely before a rear edge flap duct termination.

* * * * *